US007237934B2

(12) United States Patent
Kagiyama

(10) Patent No.: US 7,237,934 B2
(45) Date of Patent: Jul. 3, 2007

(54) VEHICLE HEADLAMP

(75) Inventor: Shinji Kagiyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 174 days.

(21) Appl. No.: 11/049,864

(22) Filed: Feb. 4, 2005

(65) Prior Publication Data

US 2005/0174794 A1 Aug. 11, 2005

(30) Foreign Application Priority Data

Feb. 5, 2004 (JP) ........................ P. 2004-028969

(51) Int. Cl.
*B60Q 1/044* (2006.01)

(52) U.S. Cl. ...................................... 362/538; 362/539

(58) Field of Classification Search ................ 362/521, 362/522, 523, 507, 538, 548, 539
See application file for complete search history.

(56) References Cited

U.S. PATENT DOCUMENTS 1,775,619 A * 9/1930 Whalen ...................... 362/302
6,300,718 B1 * 10/2001 Taniuchi et al. .............. 315/82
6,454,448 B2 * 9/2002 Taniuchi et al. ............ 362/517
6,467,941 B1 * 10/2002 Miyata et al. ............. 362/519
6,994,460 B2 * 2/2006 Yamamura .................. 362/539
7,128,455 B2 * 10/2006 Yamamura .................. 362/539

FOREIGN PATENT DOCUMENTS

JP 2-47704 U 4/1990
JP 2001-229715 A 8/2001

* cited by examiner

*Primary Examiner*—Sandra O'Shea
*Assistant Examiner*—Anabel Ton
(74) *Attorney, Agent, or Firm*—Sughrue Mion, PLLC

(57) ABSTRACT

By inserting a light source bulb into a reflector from a side thereof at a position apart downwardly from an optical axis, it is made possible to use an area situated on a side of the optical axis effectively for controlling the light distribution of a vehicle headlamp. In addition, by providing an additional reflector between the light source bulb and a shade for reflecting light from a light source laterally outwardly and diagonally forward of a vehicle through a gap between the reflector and a projection lens, a diffused area of a low beam light-distribution pattern is illuminated brightly and the diffused area is expanded laterally outwardly of the vehicle.

7 Claims, 11 Drawing Sheets

VEHICLE HEADLAMP

The present application claims foreign priority based on Japanese Patent Application P.2004-028969, filed Feb. 5, 2004, the contents of which are incorporated herein by reference.

BACKGROUND OF THE INVENTION

The present invention relates to a vehicle headlamp which is constructed to emit light so as to form a low beam light-distribution pattern, and more particularly to a so-called projector-type vehicle headlamp.

In general, in projector-type vehicle headlamps, a projection lens is disposed on an optical axis which extends in a longitudinal direction of a vehicle and a light source is disposed rearward of a rear-side focal point of the projection lens, whereby light from the light source is reflected towards the optical axis by a reflector.

Then, JP-U-02-047704 and JP-A-2001-229715 describe the projector-type vehicle headlamps adopting a sideways insertion-type headlamp construction in which the light source is made up of a light emitting portion of a light source bulb which is inserted from a side of the optical axis into the reflector so as to be fixed thereto.

As this occurs, in the vehicle headlamp described in JP-A-2001-229715, a shade for covering part of reflected light from the reflector is provided in the vicinity of the rear-side focal point of the projection lens to thereby emit light so as to form a low beam light-distribution pattern.

The longitudinal length of a lamp can be shortened so that the lamp is attempted to be made compact in size, in case the sideways insertion-type lamp construction described in JP-U-02-047704 and JP-A-2001-229715.

However, in the vehicle headlamps described in JP-U-02-047704 and JP-A-2001-229715, since the light source bulb is inserted and fixed to the reflector on the same horizontal plane as the optical axis, there is caused the following problem.

Namely, in the projector-type vehicle headlamps, while an optical axis sideways area on a reflecting surface of the reflector is suitable for formation of a diffused area of the low beam light-distribution pattern, in the event that the light source bulb is inserted and fixed to the reflector on the same horizontal plane as the optical axis, since an inserting and fixing hole of the light source bulb has to be formed in the optical axis sideways area on the reflecting surface, the optical axis sideways area cannot be used effectively to control the light distribution, and this causes a problem that it becomes difficult to ensure a sufficient brightness at the diffused area of the low beam light-distribution pattern.

SUMMARY OF THE INVENTION

The present invention was made in view of the situation. An object of the present invention is to provide a vehicle headlamp of projector-type constructed to form a low beam light-distribution pattern which can ensure a sufficient brightness at a diffused area of the low beam light-distribution pattern even in the event that the sideways insertion-type lamp construction is adopted.

Namely, according to a embodiment of the invention, a vehicle headlamp comprises a projection lens disposed on an optical axis which extends in a longitudinal direction of a vehicle, a light source disposed rearward of a rear-side focal point of the projection lens, a reflector for reflecting light from the light source forward and towards the optical axis, and a shade disposed such that an upper end edge thereof is positioned near the optical axis in the vicinity of the rear-side focal point and covering part of reflected light from the reflector, and thereby adapted to emit light so as to form a low beam light-distribution pattern, wherein the light source is made up of a light emitting portion of a light source bulb which is inserted from a side of the optical axis into the reflector at a position spaced apart downwardly from the optical axis so as to be fixed thereto, and wherein an additional reflector is provided between the light source bulb and the shade for reflecting light from the light source laterally outwardly and diagonally forward of the vehicle through a gap between the reflector and the projection lens, whereby an additional light-distribution pattern is formed by reflected light from the additional reflector which additional light-distribution pattern partially overlaps a laterally outward end portion of a basic light-distribution pattern formed by the light from the light source which has been reflected by the reflector and transmitted through the projection lens.

The type of the light source bulb is not particularly limited, and for example, discharge bulbs and halogen bulbs can be adopted.

While the insertion and fixing of the light source bulb is implemented "at the position spaced apart downwardly from the optical axis", the downwardly displaced distance of the insertion and fixing position from the optical axis is not particularly limited. As this occurs, from the viewpoint of preventing the light from the light source bulb which has been reflected on the area near the optical axis on the reflecting surface of the reflector from being covered by the light source bulb, the downwardly displaced distance is set preferably to a value of 10 mm or greater, and more preferably to a value of 15 mm or greater. In contrast, from the viewpoint of ensuring a sufficient incident beam from the light source bulb on the reflecting surface of the reflector, the downwardly displaced distance is set preferably to a value of 30 mm or smaller.

As long as the additional reflector is such as to be provided between the light source bulb and the shade for reflecting light from the light source laterally outwardly and diagonally forward of the vehicle through the gap between the reflector and the projection lens, whereby the additional light-distribution pattern is formed by reflected light from the additional reflector which additional light-distribution pattern partially overlaps the laterally outward end portion of the basic light-distribution pattern, the size and reflecting surface shape of the additional reflector are not particularly limited.

As is shown by the construction that has been described above, while the vehicle headlamp according to the embodiment of the invention is constructed as a projector-type vehicle headlamp, since the light source bulb thereof is inserted from the side of the optical axis extending in the longitudinal direction of the vehicle into the reflector so as to be fixed thereto, the longitudinal length of the lamp is shortened so that the lamp can be attempted to be made compact in size.

As this occurs, since the insertion and fixing of the light source bulb is implemented at the position which is apart downwardly from the optical axis, the sideways areas from the optical axis on the reflecting surface of the reflector can be made effective use as light distribution controlling areas. Then, a diffused area of the low beam light-distribution pattern can be formed by the reflected light from the sideways areas from the optical axis, whereby a sufficient brightness can be ensured at the diffused area so formed.

In addition, since the additional reflector is provided between the light source bulb and the shade for reflecting light from the light source laterally outwardly and diagonally forward of the vehicle through the gap between the reflector and the projection lens, whereby the additional light-distribution pattern is formed by reflected light from the additional reflector which additional light-distribution pattern partially overlaps the laterally outward end portion of the basic light-distribution pattern, the diffused area of the low beam light-distribution pattern can be expanded laterally outwardly of the vehicle.

As this occurs, since the additional reflector is provided between the light source bulb and the shade, the direct light from the light source which is to be covered by the shade can be made effective use as foreground illuminating light by the additional reflector, and moreover, the provision of the additional reflector can prevent the excessive covering of the reflected light from the reflector.

Thus, according to the invention, in the projector-type vehicle headlamp which is constructed so as to form the low beam light-distribution pattern, even in the event that the sideways insertion-type lamp construction is adopted, the sufficient brightness can be ensured at the diffused area of the low beam light-distribution pattern.

Moreover, in the invention, since the diffused area of the low beam light-distribution pattern can be expanded laterally outwardly of the vehicle by the formation of the additional light-distribution pattern, the visibility of the road surface situated laterally outwardly and diagonally forward of the vehicle can be increased, thereby making it possible to enhance the running safety when the vehicle turns.

Furthermore, in the invention, since the additional reflector is provided between the light source bulb and the shade, the aforesaid functions and advantages can be obtained without increasing the vertical height of the lamp.

In the construction described above, in the event that the light source is constructed as a linear light source which extends along the bulb center axis, since the direct light directed from the light source towards the shade constitutes an outgoing light in a direction which intersects with the bulb center axis substantially at right angles, the quantity of the direct light becomes quite large. Consequently, as shown in the construction, the provision of the additional reflector between the light source bulb and the shade to make effective use of the direct light directed from the light source to the shade as the foreground illuminating light is particularly effective in enhancing the beam utilization rate relative to the outgoing light from the light source.

In the construction, while as has been described above, there is no specific limitation on the shape of the reflecting surface of the additional reflector, in the event that the reflecting surface is constructed so as to have a substantially elliptical horizontal sectional shape in which the light source constitutes a first focal point and a predetermined point between the reflector and the projection lens constitutes a second focal point, since reflected light from the additional reflector can be temporarily converged and thereafter diffused in the horizontal direction, the reflected light can easily be passed through the gap between the reflector and the projection lens, and the road surface situated laterally outwardly and diagonally forward of the vehicle can be illuminated widely.

In addition, in the construction, in the event that the additional reflector is constructed so as to have an extended reflecting surface portion which is extended and formed so as to extend forward from the reflecting surface, the additional light-distribution pattern can be illuminated more brightly by reflected light from the extended reflecting surface portion.

In this case, in the event that a second additional reflector is provided laterally outwardly of the additional reflector for reflecting light from the light source towards the extended reflecting surface portion of the additional reflector, whereby a second additional light-distribution pattern is formed by reflected light from the second additional reflector which second additional light-distribution pattern partially overlaps a laterally outward end portion of the additional light-distribution pattern, the diffused area of the low beam light-distribution pattern can be expanded further laterally outwardly of the vehicle, thereby making it possible to enhance further the visibility of the road surface situated laterally outwardly and diagonally forward of the vehicle.

As this occurs, in the event that a reflecting surface of the second additional reflector has a substantially ellipsoidal surface shape in which the light source constitutes a first focal point and a predetermined point between the second additional reflector and the additional reflector constitutes a second focal point, the reflected light control by the extended reflecting surface portion can be implemented with good accuracy.

In addition, in the construction, in the event that a transparence cover is provided forward of the projection lens which transparence cover is formed so as to extend from a laterally in board side to a laterally outboard side of the vehicle and then to move around a corner to continue to extend rearward, whereby reflected light from the additional reflector is transmitted through a portion of the transparence cover where the cover moves around the corner to continue to extend rearward so as to be emitted diagonally forward of the vehicle, an inadvertently covering of the reflected light from the additional reflector by a lamp body or the like can be prevented.

DESCRIPTION OF THE PREFERRED EMBODIMENTS

An embodiment of the invention will be described below by reference to the drawings.

Figure 1:
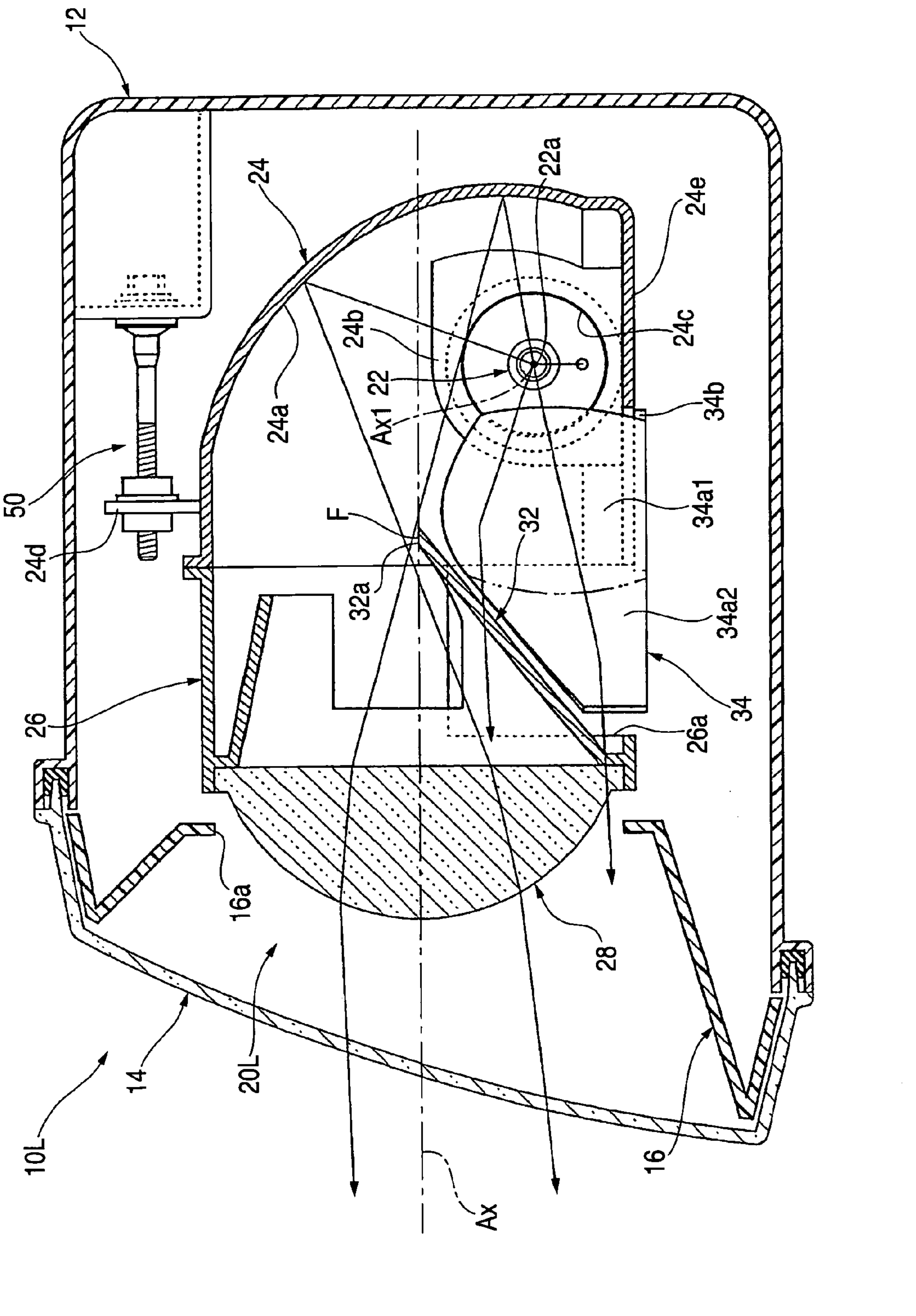
FIG. 1 is a vertically longitudinal sectional view showing a left-hand side vehicle headlamp according to an embodiment of the invention.
Figure 2:
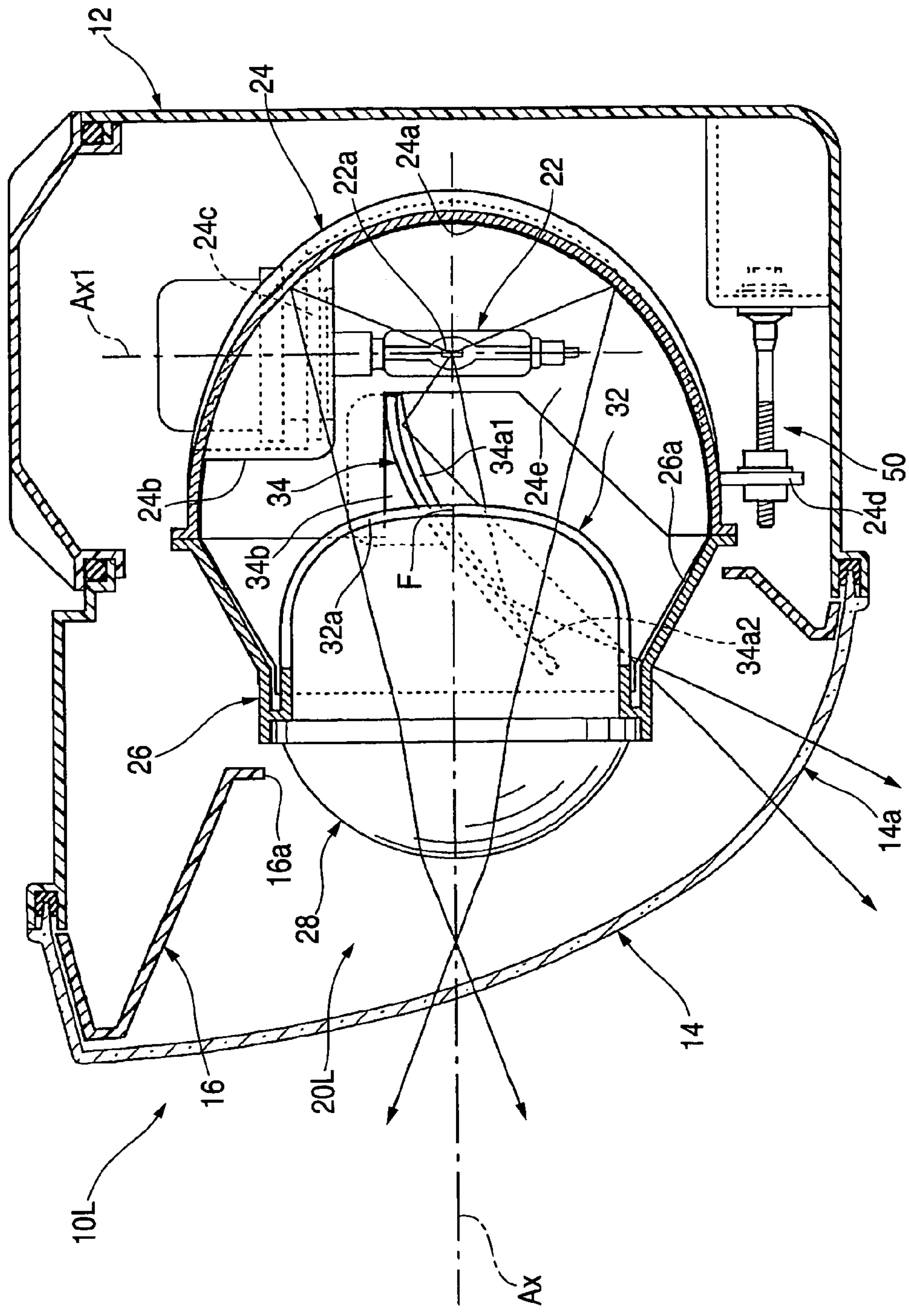
FIG. 2 is a horizontally longitudinal sectional view of the vehicle headlamp.

FIGS. 1 and 2 are, respectively, a vertically longitudinal section view a horizontally longitudinal section view, both of which show a left vehicle headlamp 10L according to an embodiment of the invention.

As shown in these drawings, the vehicle headlamp 10L is a lamp disposed at a left-hand side front end portion of a vehicle and is constructed such that a lamp unit 20L having an optical axis Ax extending in a longitudinal direction of the vehicle is accommodated within a lamp compartment made up of a lamp body 12 and a transparent transparence cover mounted in a front end opening in the lamp body in such a manner as to be tilted vertically and laterally via an aiming mechanism 50.

Then, in a stage where an aiming adjustment by the aiming mechanism 50 has been completed, the optical axis Ax of the lamp unit 20 is in a state where the axis extends in a downward direction at an angle of on the order of 0.5 to 0.6° relative to the longitudinal direction of the vehicle.

The transparence cover 14 is formed along the shape of a vehicle body at a front left-hand side corner portion of a vehicle in such a manner as to extend from a laterally inboard side to a laterally outboard side of the vehicle and then to move around so as to continue to extend rearward at a corner portion 14*a* formed on the transparence cover 14. In addition, an extension panel 16 is provided in the lamp compartment in such a manner as to follow the transparence cover 14. An opening 16*a* is formed in the extension panel 16 in such a manner as to surround the lamp unit 20L at a position in the vicinity of a front end of the lamp unit 20L.

Figure 3:
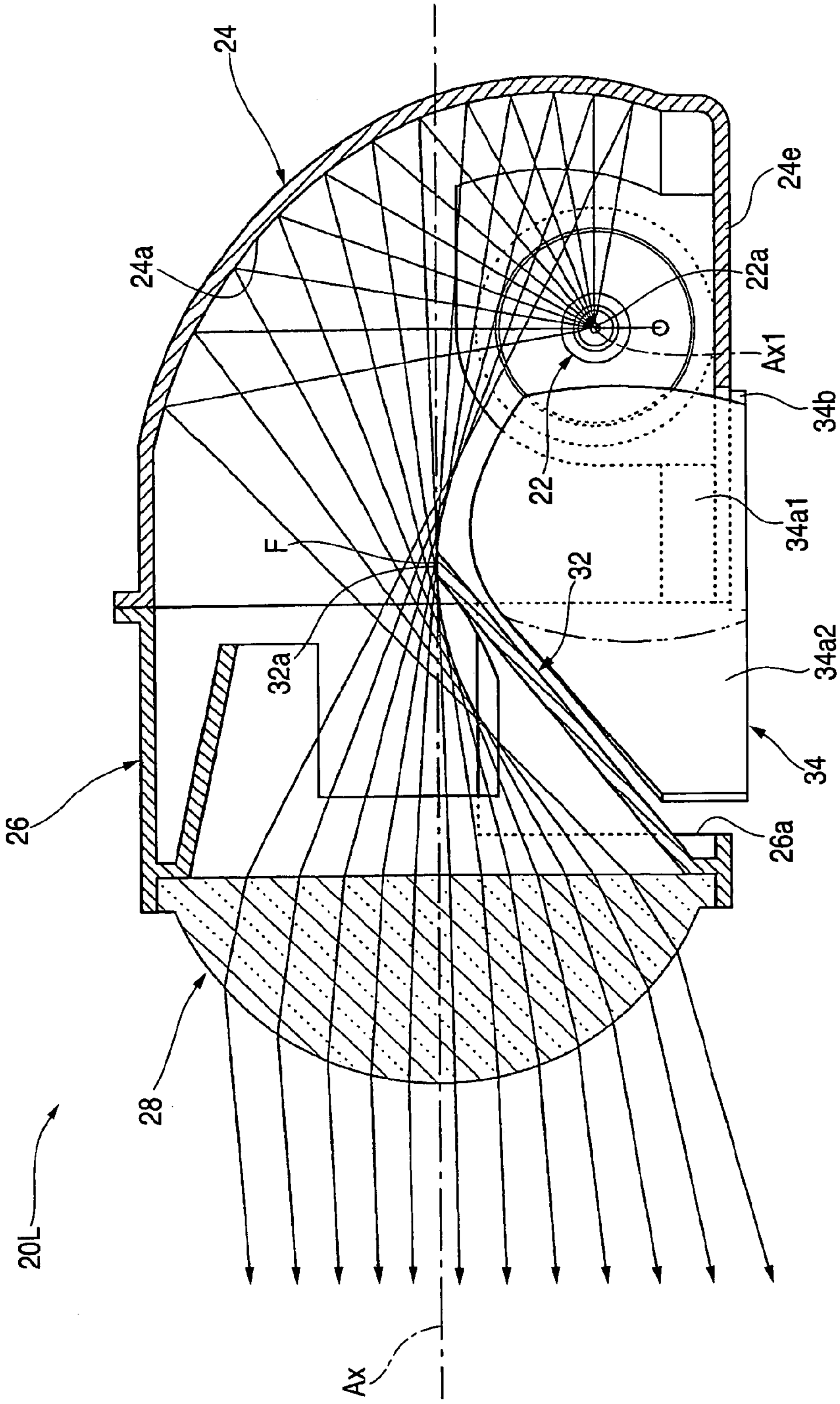
FIG. 3 is a vertically longitudinal section view showing a lamp unit of the vehicle headlamp as a single component, which shows an optical path of light reflected on an additional reflector.
Figure 4:
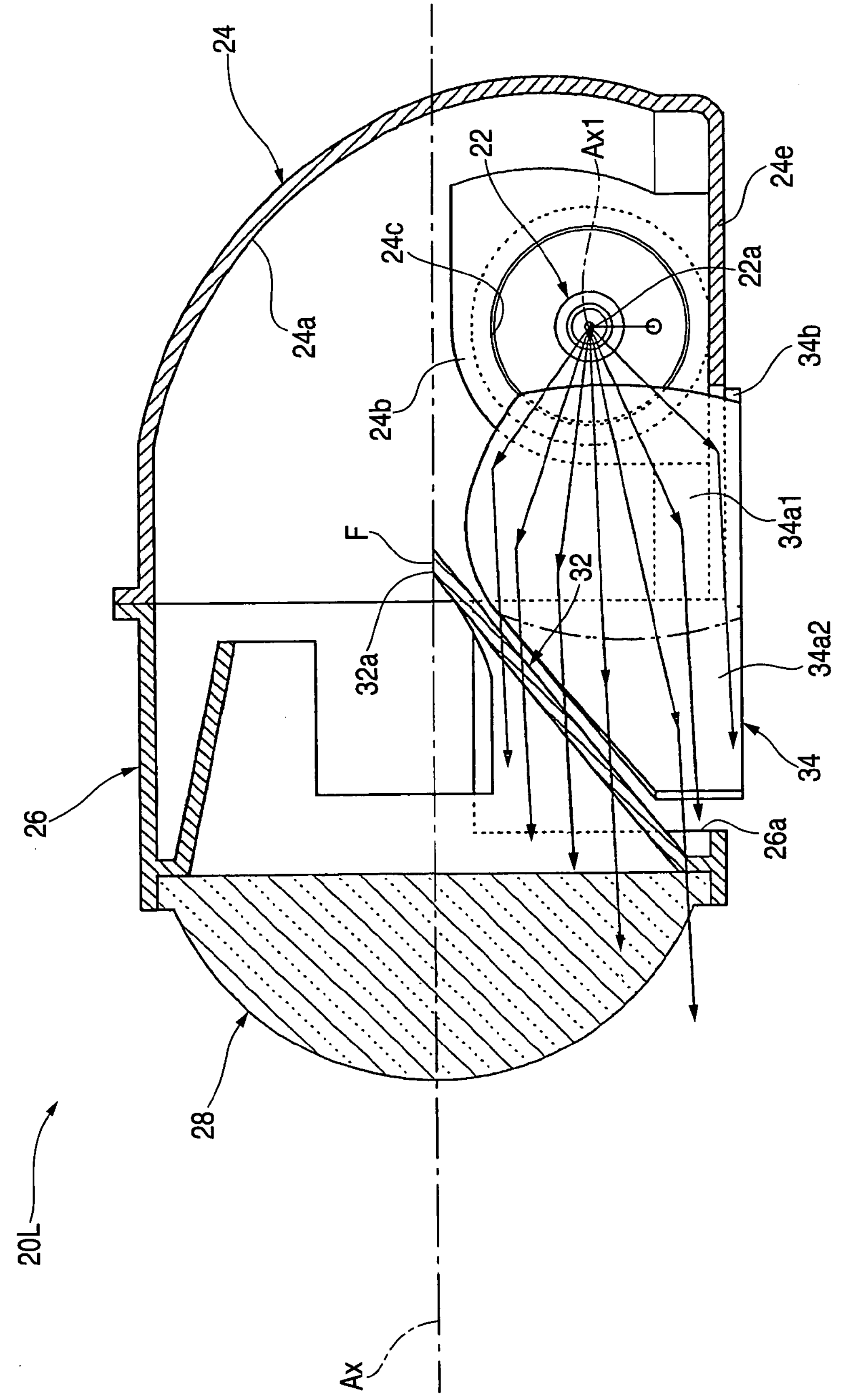
FIG. 4 is a vertically longitudinal section view showing the lamp unit as a single component, which shows an optical path of light reflected on an additional reflector.
Figure 5:
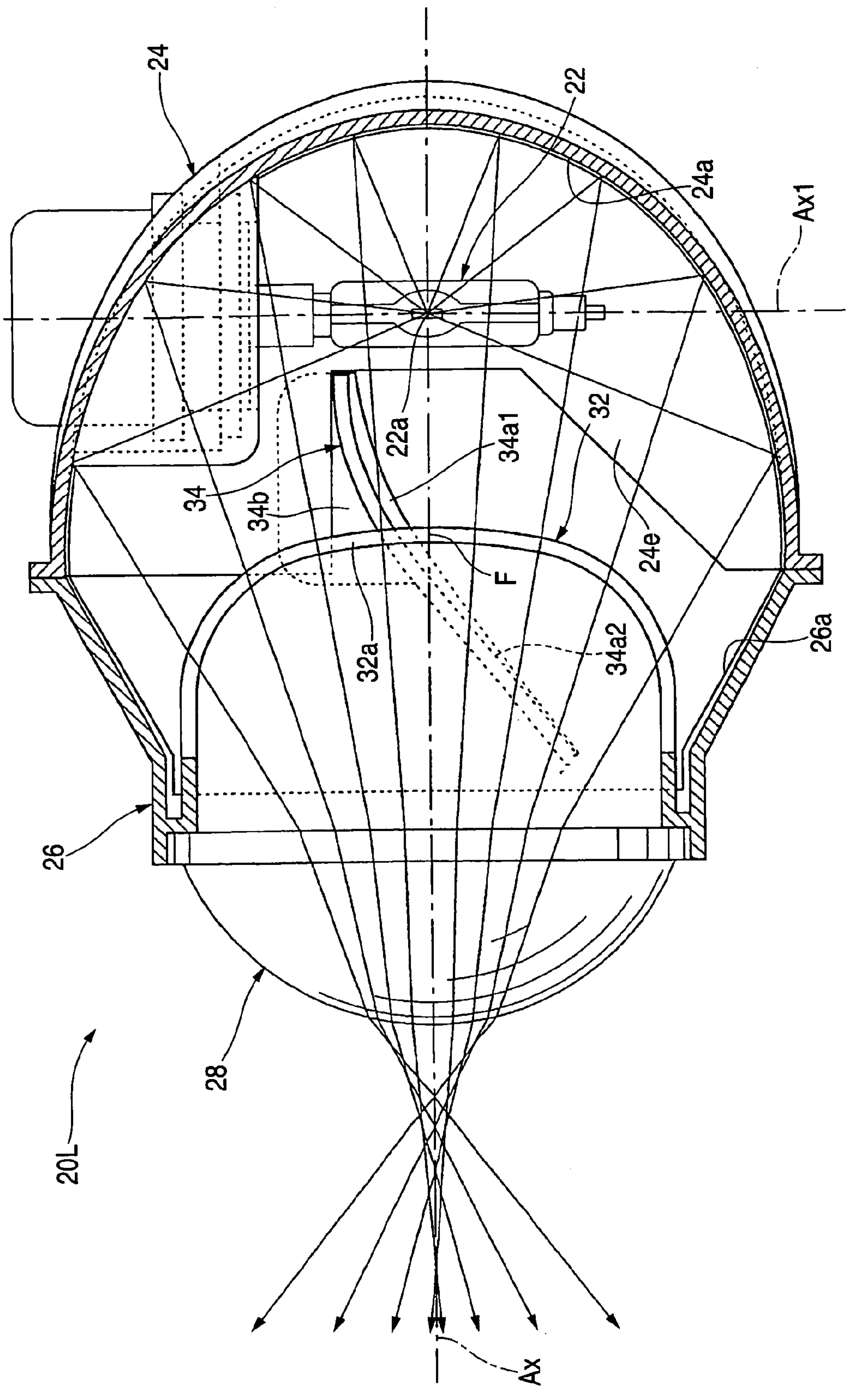
FIG. 5 is a horizontally longitudinal section view showing the lamp unit as a single component, which shows an optical path of light reflected on the reflector.
Figure 6:
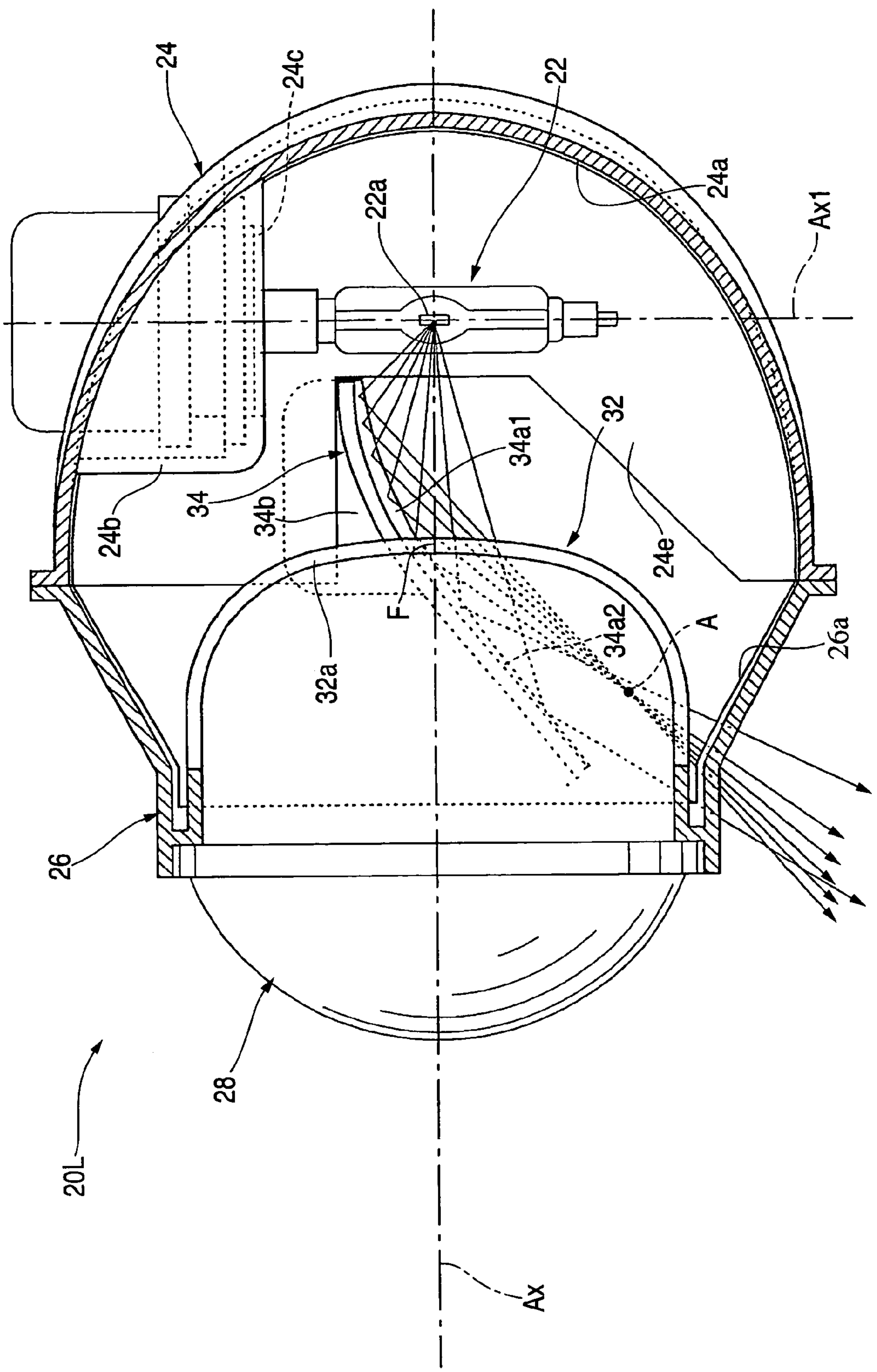
FIG. 6 is a horizontally longitudinal section view showing the lamp unit as a single component, which shows an optical path of light reflected on the additional reflector.

FIGS. 3 and 4 are vertically longitudinal section views showing the lamp unit 20L only as a single component and FIGS. 5 and 6 are horizontally longitudinal section views.

As shown in those drawings, the lamp unit 20L is a projector-type lamp unit and includes a light source bulb 22, a reflector 24, a holder 26, a projection lens 28, a shade 32 and an additional reflector 34.

The projection lens 28 is a plano-convex lens in which a front-side surface constitutes a convex surface and a rear-side surface constitutes a flat surface and is disposed on an optical axis Ax. Then, this projection lens 28 is designed to project forward an image on a focal plane which includes a rear-side focal point F thereof as an inverted image.

The light source bulb 22 is a discharge bulb such as a metal halide bulb or the like in which a discharge light emitting portion constitutes a light source 22*a*, and the light source 22*a* is constructed as a linear light source which extends in a direction of a bulb center axis Ax1. Then, this light source bulb 22 is inserted into the reflector 24 from a right-hand side of the optical axis Ax at a position rearward of the rear-side focal point of the projection lens 28 and downwardly apart from the optical axis Ax (for example, a position on the order of 20 mm downwardly apart from the optical axis Ax) so as to be fixed to the reflector 24. This insertion and fixing of the light source bulb 22 is implemented in such a manner as to position a light emitting center of the light source 22*a* vertically below the optical axis Ax in a state where the bulb center axis Ax1 is set so as to extend in a horizontal direction in a vertical plane which intersects with the optical axis Ax at right angles.

The reflector 24 has a reflecting surface 24*a* which reflects light from the light source bulb 22 forward and towards the optical axis Ax. This reflecting surface 24*a* has a substantially elliptical sectional shape and the eccentricity thereof is set to gradually increase from a vertical sectional plane to a horizontal sectional plane. Then, from this construction, as shown in FIGS. 3 and 5, light from the light source 22*a* which is reflected on the reflecting surface 24*a* is substantially converged on the vicinity of the rear-side focal point F within the vertical sectional plane and a converged position where the light is so converged is moved quite forward within the horizontal sectional plane.

A bulb inserting and fixing portion 24*b* is formed on a lower right-hand side area of the reflecting surface 24*a* of the reflector 24 in such a manner as to protrude from the reflecting surface 24*a*, and a bulb inserting hole 24*c* is formed in a left side portion of the bulb inserting and fixing portion 24*b*. Then, the reflector 24 is supported on the lamp body 12 at aiming brackets formed at three positions thereof via an aiming mechanism 50.

The holder 26 is formed in such a manner as to extend forward from a front end opening in the reflector 24 in a cylindrical fashion, is fixedly supported on the reflector 24 at a rear end portion thereof and supports the projection lens 28 at a front end portion thereof. A notched portion 26*a* is formed over most of a lower half portion of the holder 26.

The shade 32 is formed integrally with the holder 26 in such a manner as to be positioned substantially at a lower half portion in an interior space of the holder 26. The shade 32 is formed such that an upper end edge 32*a* passes the rear-side focal point F of the projection lens 28, whereby part of reflected light from the reflecting surface 24*a* of the reflector 24 is covered so as to remove most of upward light emitted forward from the projection lens 28. As this occurs, the shade 32 is formed, as viewed from the side, in such a manner as to extend substantially linearly from the upper end edge 32*a* to be directed downward and diagonally forward.

The additional reflector 34 is provided between the light source bulb 22 and the shade 32 and is fixed to a bottom wall 24*e* of the reflector 24 at a flange portion 34*b* formed at a lower end portion thereof. Then, this additional reflector 34 is constructed so as to allow light from the light source 22*a* to pass through the notched portion 26*a* in the holder 26 (namely, a gap between the reflector 24 and the projection lens 28) so as to be reflected diagonally left forward of the vehicle (namely, laterally outwardly and diagonally forward of the vehicle).

As shown in FIG. 6, a reflecting surface 34*a*1 of the additional reflector 32 is formed such that a horizontal sectional shape thereof is set to a substantially elliptical shape in which a light emitting center of the light source 22*a* constitutes a first focal point and a predetermined point A between the reflector 24 and the projection lens 28 constitutes a second focal point, whereas a vertical sectional shape thereof is set to a substantially parabolic shape in which the light emitting center of the light source 22*a* constitutes a focal point and which has an axis which extends forward while being directed slightly downward from the optical axis Ax.

This additional reflector 34 has an extended reflecting surface portion 34*a*2 which is extended and formed so as to extend forward from the reflecting surface 34*a*1. The extended reflecting surface portion 34*a*2 is formed such that a horizontal sectional shape thereof is set to a substantially linear shape which extends diagonally left forward from a front edge (indicated by a double-dashed line in FIGS. 1, 3 and 4) of the reflecting surface 34*a*1, whereas a vertical sectional shape thereof is set to a substantially parabolic shape similar to the substantially parabolic shape of the reflecting surface 34*a*1. Then, this extended reflecting surface portion 34*a*2 is constructed to reflect light from the light source 22*a* further towards the side of the vehicle than the reflected light from the reflecting surface 34*a*1.

Note that while the opening 16*a* in the extension panel 16 is formed, as shown in FIG. 1, in such a manner as to surround the lamp unit 20L in the vicinity of the front of the projection lens 28, as to a left side part thereof, as shown in FIG. 2, the opening 16*a* is formed in such a manner as to surround the lamp unit 20L in the vicinity of a rear end portion of the holder 26. By adopting this construction, a risk is avoided that the reflected light from the additional reflector 34 is inadvertently covered by the extension panel 16.

Figure 7:
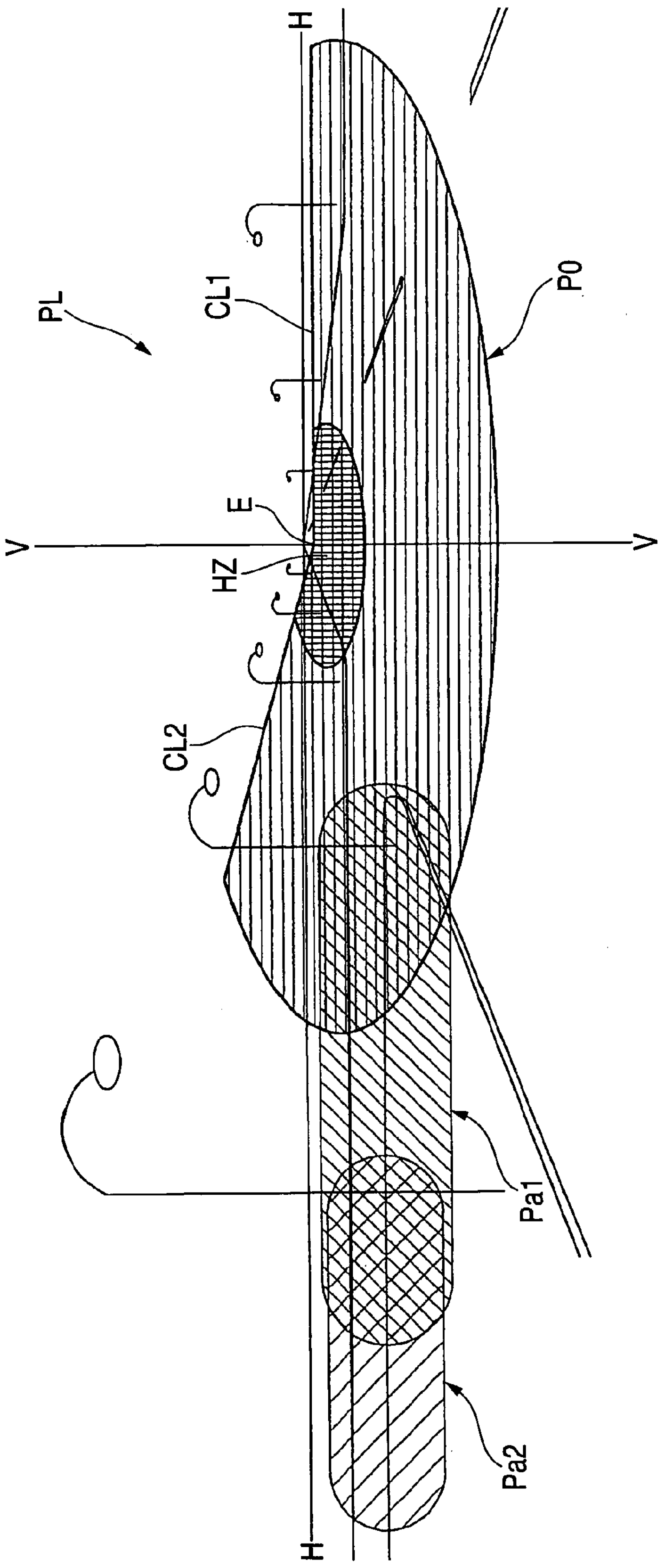
FIG. 7 is a perspective view of a low beam light-distribution pattern that is formed by light emitted forward from the vehicle headlamp on an imaginary vertical screen disposed at a position 25 m forward of the lamp.

FIG. 7 is a perspective view of a low beam light-distribution pattern formed by light emitted forward from the vehicle head lamp 10L on an imaginary vertical screen that is disposed at a position 25 m forward of the lamp.

As shown in the same drawing, a low beam light-distribution pattern PL is a low beam light-distribution pattern for a left-hand light-distribution and has at an upper edge thereof a horizontal cut-off line CL1 and an inclined cut-off line CL2 which rises from the horizontal cut-off line CL1 at a predetermined angle (for example, on the order of 15°), and an elbow point E where the two cut-off lines CL1, CL2 intersect with each other is set at a position on the order of 0.5 to 0.6° down from an H-V point which is a vanishing point in a front direction of the lamp. Then, in the low beam light-distribution pattern PL, a hot zone HZ, which is a high luminous intensity area, is formed so as to surround the elbow point E.

This low beam light-distribution pattern PL is formed as a combined light-distribution pattern of a basic light-distribution pattern PO and two additional light-distribution patterns Pa1, Pa2.

The basic light-distribution pattern PO is a light-distribution pattern which constitutes a basic shape of a low beam light-distribution pattern and is designed to be formed by light from the light source 22*a* which is reflected by the reflector 24 and is then transmitted through the projection lens 28. Then, the horizontal and inclined cut-off lines CL1, CL2 are designed to be formed in the basic light-distribution pattern PO as an inverted projected image of the upper end edge 32*a* of the shade 32.

In contrast, the additional light-distribution patterns Pa1, Pa2 are light-distribution patterns that are additionally formed not only to reinforce the brightness of a left diffused area of the basic light-distribution pattern PO but also to expand the low beam light-distribution pattern PL largely leftward from the basic light-distribution pattern PO and are designed to be formed by light from the light source 22*a* which is reflected by the additional reflector 34 so as to be directed diagonally left forward of the vehicle through the gap between the reflector 24 and the projection lens 28 (namely, the notched portion 26*a* in the holder 26).

As this occurs, the additional light-distribution pattern Pa1 is a light-distribution pattern which is formed by light from the reflecting surface 34*a*1 of the additional reflector 34, and the additional light-distribution pattern Pa2 is a light-distribution pattern which is formed by reflected light from the extended reflecting surface portion 34*a*2 of the additional reflector 34.

Due to the fact that the reflecting surface 34*a*1 has the substantially elliptical horizontal sectional shape and the substantially parabolic vertical sectional shape, the additional light-distribution pattern Pa1 becomes a light-distribution pattern which is elongated laterally and which has a substantially uniform luminous intensity distribution. In addition, due to the fact that the extended reflecting surface portion 34*a*2 of the additional reflector 34 has the substantially linear horizontal sectional shape and the substantially parabolic vertical sectional shape, the additional light-distribution pattern Pa2 also becomes a light-distribution pattern which is elongated laterally and which has a substantially uniform luminous intensity distribution. As this occurs, since reflected light from the extended reflecting surface portion 34*a*2 is emitted much closer to the side of the vehicle than reflected light from the reflecting surface 34*a*1, the additional light-distribution pattern Pa2 is formed so as to partially overlap a left end portion of the additional light-distribution pattern Pa1.

While upper end edges of the respective additional light-distribution patterns Pa1, Pa2 are situated slightly lower than the horizontal cut-off line CL1, this is because axes of parabolas which constitute the vertical sectional shapes of the reflecting surface 34*a*1 and the extended reflecting surface portion 34*a*2 are set so as to extend forward while being directed slightly downward of the optical axis Ax.

As has been described in detail heretofore, while the vehicle headlamp 10L according to the embodiment is constructed as a projector-type vehicle headlamp for emitting light for formation of the low beam light-distribution pattern PL, since the light source bulb 22 is inserted from the side of the optical axis Ax which extends in the longitudinal direction of the vehicle so as to be fixed thereto, the longitudinal length of the lamp can be shortened, thereby making it possible to attempt to make the lamp compact in size.

As this occurs, since the insertion and fixing of the light source bulb 22 is implemented at the position apart downwardly from the optical axis Ax, the area on the reflecting surface 24*a* of the reflector 24 which is situated on the side of the optical axis can be used effectively for controlling the light distribution. Then, the diffused area of the low beam light-distribution pattern PL is formed by the reflected light from the area situated on the side of the optical axis, so that a sufficient brightness can be ensured in the diffused area.

In addition, since the additional reflector 34 is provided between the light source bulb 22 and the shade 32 for reflecting the light from the light source 22*a* laterally outwardly and diagonally forward of the vehicle through the gap between the reflector 24 and the projection lens 28 to thereby form the additional light-distribution patterns Pa1, Pa2 which partially overlap the laterally outward end portion of the basic light-distribution pattern PO, the diffused area of the low beam light-distribution pattern PL can be laterally outwardly expanded.

As this occurs, since the additional reflector 34 is provided between the light source bulb 22 and the shade 32, the direct light from the light source 22*a* that is to be covered by the shade 32 can be effectively used as a foreground illuminating light, and moreover, the provision of the additional reflector 34 can prevent the excessive covering of the reflected light from the reflector 24.

Thus, according to the embodiment, in the projector-type vehicle headlamp which is constructed so as to form the low beam light-distribution pattern, even in the event that the sideways insertion-type lamp construction is adopted, the brightness at the diffused area of the low beam light-distribution pattern PL can be sufficiently ensured.

Moreover, in the embodiment, since the formation of the additional light-distribution patterns Pa1, Pa2 can expand the diffused area of the low beam light-distribution pattern PL laterally outwardly of the vehicle, the visibility of the road surface situated laterally outwardly and diagonally forward of the vehicle can be increased, thereby making it possible to enhance the running safety when the vehicle turns leftward.

Furthermore, in the embodiment, since the additional reflector 34 is provided between the light source bulb 22 and the shade 32, the aforesaid functions and advantages can be obtained without increasing the vertical width of the lamp unit 20L.

As with the embodiment, in the event that the light source 22*a* is constructed as the linear light source which extends along the bulb center axis Ax1, since the quantity of direct light directed from the light source 22*a* towards the shade 32 becomes quite large, the effective use of the direct light directed from the light source 22*a* towards the shade 32 as a foreground illuminating light by providing the additional reflector 34 between the light source bulb 22 and the shade 32 is particularly effective in increasing the beam utilization rate relative to light emitted from the light source 22*a*.

In addition, in the embodiment, since the reflecting surface 34*a*1 has the substantially elliptical horizontal sectional shape in which the light source 22*a* constitutes the first focal point and the predetermined point A between the reflector 24 and the projection lens constitutes the second focal point, the reflected light from the additional reflector 34 can be temporarily converged and thereafter can be diffused in the horizontal direction, whereby the reflected light from the additional reflector 34 can easily be passed through the gap between the reflector 24 and the projection lens 28 and the road surface situated laterally outwardly and diagonally forward of the vehicle can be illuminated widely by the reflected light so passed through the gap.

As this occurs, since the additional reflector 34 has the extended reflecting surface portion 34*a*2 which is extended and formed so as to extend forward from the reflecting surface 34*a*1, the additional light-distribution patterns Pa1, Pa2 can be illuminated more brightly by the reflected light from the extended reflecting surface portion 34*a*2.

In the embodiment, since the transparence cover 14 is provided in front of the projection lens 28 in such a manner that the transparence cover 14 is curved at the corner portion 14*a* of the transparence cover 14 to continuously extend rearward from a laterally inboard side to a laterally outboard side, so that the reflected light from the additional reflector 34 is designed to be emitted diagonally forward of the vehicle through the corner portion 14*a*, the risk of the reflected light from the additional reflector 34 being inadvertently covered by the lamp body 12 or the like can be prevented.

Next, a right vehicle headlamp 10R according to the embodiment will be described.

Figure 8:
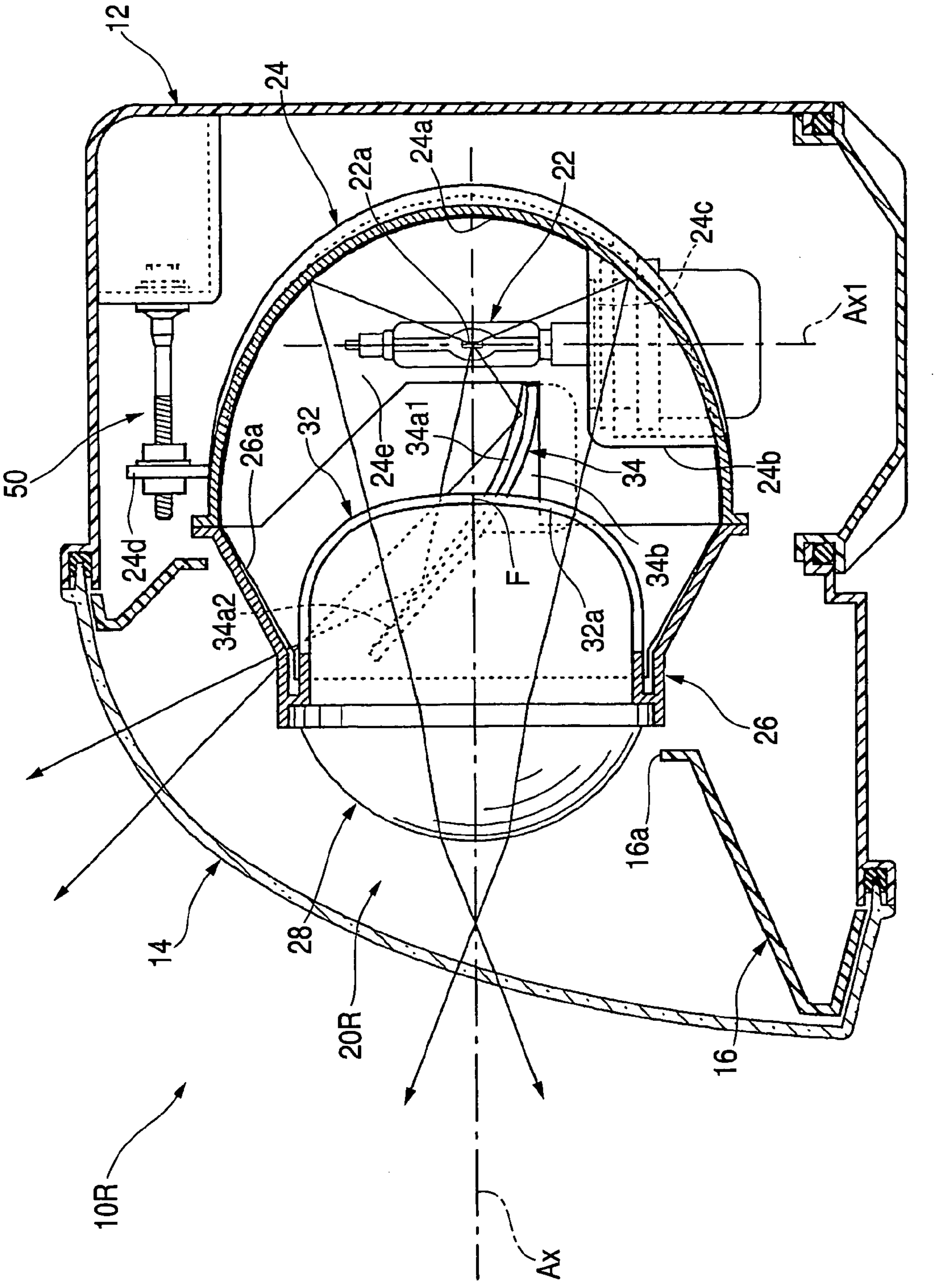
FIG. 8 is a vertically longitudinal section view showing a right-hand side vehicle headlamp according to the embodiment.

As shown in FIG. 8, this vehicle headlamp 10R is a lamp that is disposed at a right front portion of the vehicle, and while the shapes of a reflecting surface of a reflector 24 and a shade 32 of a lamp unit 20R thereof are made to be those which results from the parallel movement of the reflector 24 and the shape 32 of the lamp unit 20L of the vehicle headlamp 10L, the other lamp constituent elements such as a transparence cover 14 and an additional reflector 34 are constructed laterally symmetrically with those of the vehicle headlamp 10L.

Figure 9:
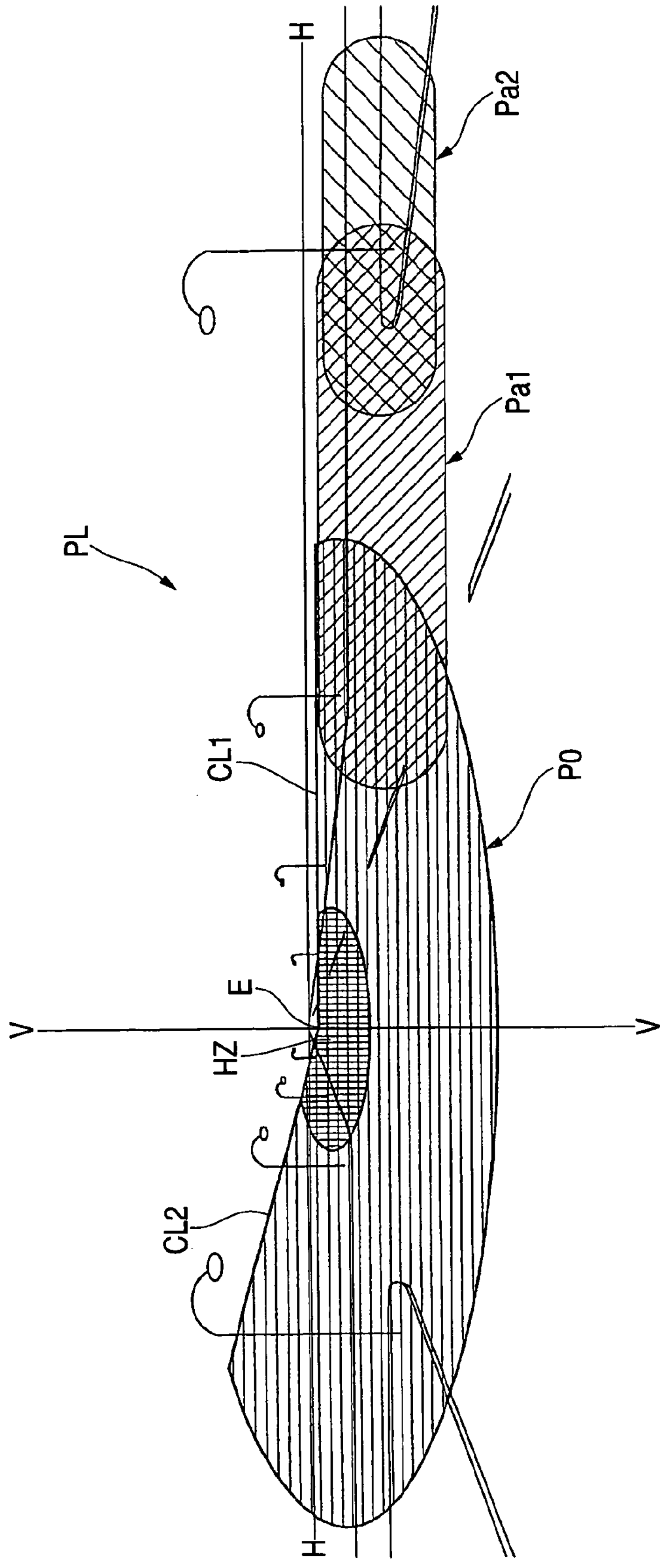
FIG. 9 is a perspective view of a low beam light-distribution pattern formed by light emitted forward by the vehicle headlamp shown in FIG. 8 on the imaginary vertical screen.

Also in this vehicle headlamp 10R, as shown in FIG. 9, a sufficient brightness in a diffused area in a low beam distribution pattern can be ensured by forming additional light-distribution patterns Pa1, Pa2, and the diffused area can be expanded laterally outwardly (namely, diagonally right forward of the vehicle). Then, by adopting this construction, the visibility of a road surface situated laterally outwardly and diagonally forward of the vehicle can be enhanced, thereby making it possible to enhance the running safety when the vehicle turns rightward.

Next, a modified example of the embodiment will be described.

Figure 10:
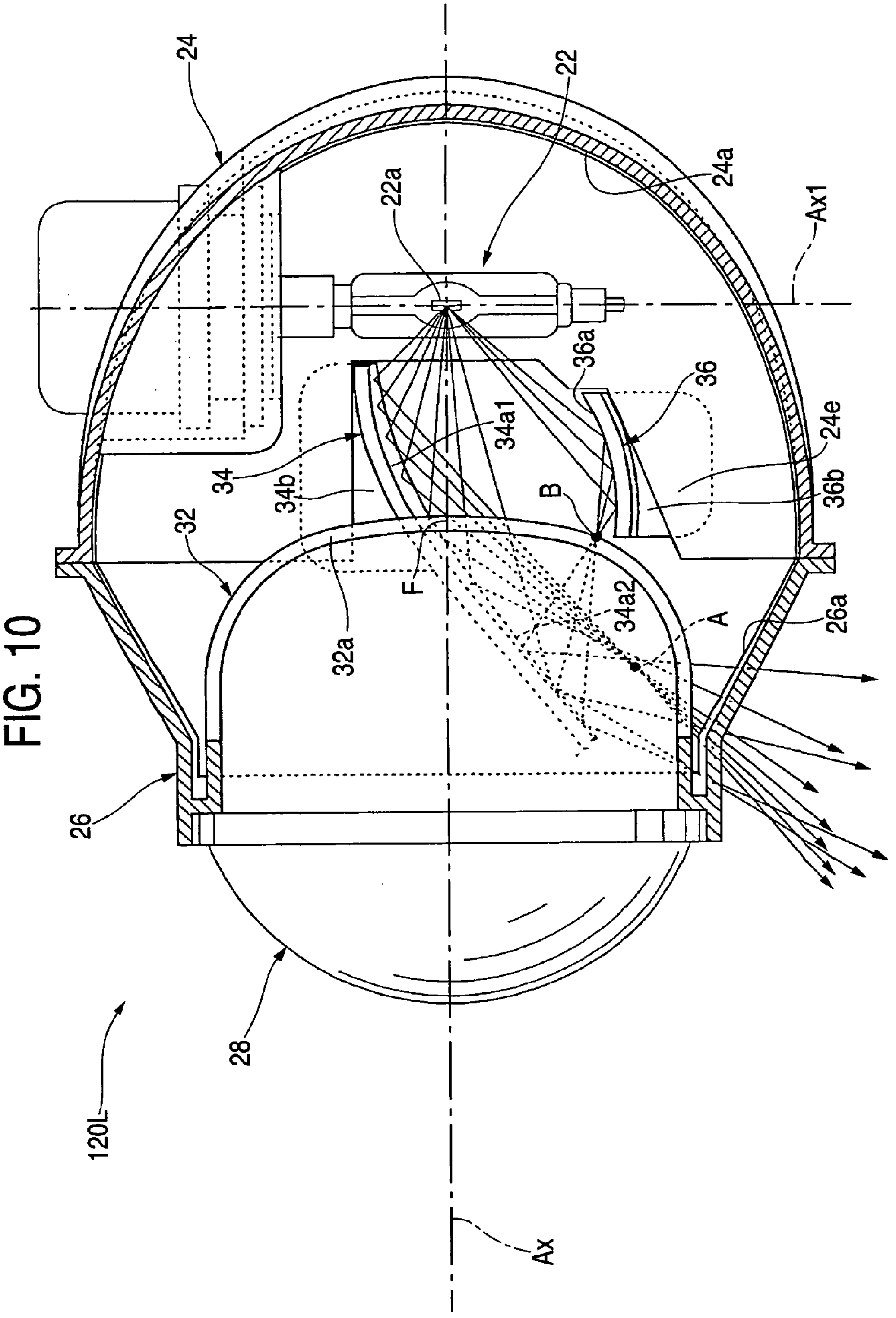
FIG. 10 is a drawing similar to FIG. 6, which shows a modified example from the embodiment.

FIG. 10 is a horizontally longitudinal section view showing a lamp unit 12L of a left-hand side vehicle headlamp according to the modified example as a single component.

As shown in the same drawing, in this modified example, a second additional reflector 36 is provided leftward (namely, laterally outwardly) of the additional reflector 34. This second additional reflector 36 is fixed to the bottom wall 24*e* of the reflector 24 at a flange portion 36*b* which is formed at a lower end portion thereof.

Figure 11:
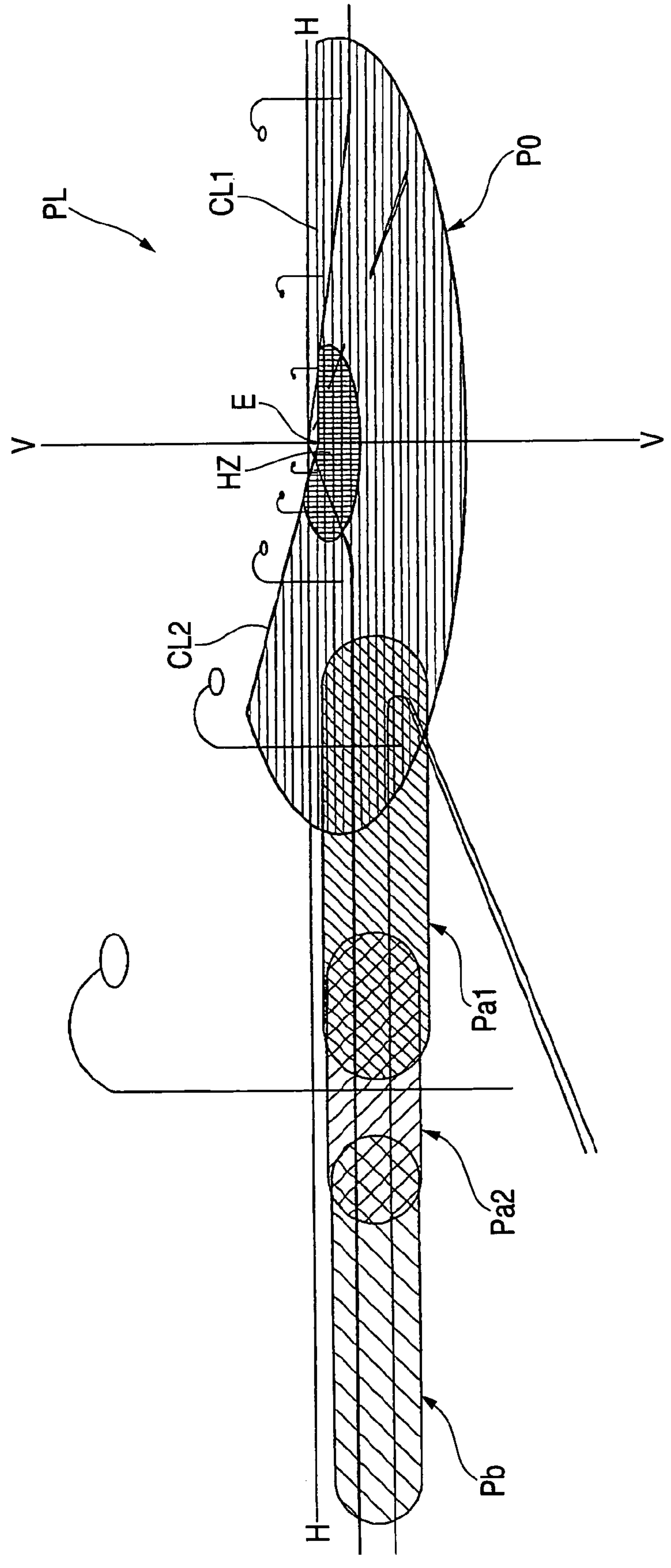
FIG. 11 is a drawing similar to FIG. 7, which shows the function of the modified example.

Then, this second additional reflector 36 reflects light from the light source 22*a* towards the extended reflecting surface portion 34*a*2 of the additional reflector 34, whereby, as shown in FIG. 11, a second additional light-distribution pattern Pb is formed which partially overlaps a laterally outward end portion of the additional light-distribution pattern Pa2.

As this occurs, a reflecting surface 36*a* of the second additional reflector 36 has a substantially ellipsoidal surface shape in which the light emitting center of the light source 22*a* constitutes a first focal point and a predetermined point B between the second additional reflector 36 and the additional reflector 34 constitutes a second focal point. Then, by adopting this construction, diffused light that has passed through the predetermined point B is incident on the extended reflecting surface portion 34*a*2 of the additional reflector 34, whereby the control of reflected light by the extended reflecting surface portion 34*a*2 can be implemented with good accuracy, and the horizontal diffusion angle of the second additional light-distribution pattern Pb can be ensured sufficiently.

By adopting the construction of the modified example, the diffused area of the low beam light-distribution pattern PL can be expanded further laterally outwardly of the vehicle, thereby making it possible to enhance further the visibility of the road surface situated laterally outwardly and diagonally forward of the vehicle.

Note that in the event that a similar construction to that of the lamp unit 120L like this is adopted for the lamp unit of the right-hand side vehicle headlamp, similar function and advantage to those obtained as to the lamp unit 120L can also, needless to say, be obtained.

While, in the embodiment and the modified example, the light source bulb 22 has been described as being inserted into the reflector 24 directly from the side thereof, even in the event that the insertion angle deviates slightly from this direct side direction, substantially similar function and advantage to those obtained as to the embodiment and modified example can be obtained, provided that the deviation in insertion angle remains 30° or smaller with respect to vertical and longitudinal directions.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle headlamp comprising:

a projection lens disposed on an optical axis extending in a longitudinal direction of a vehicle;

a light source disposed rearward of a rear-side focal point of the projection lens, wherein the light source is configured with a light emitting portion of a light source bulb;

a reflector for reflecting light from the light source forward and towards the optical axis, wherein the light source bulb is inserted from a side of the optical axis into the reflector at a position spaced apart downwardly from the optical axis;

a shade for covering part of reflected light from the reflector and forming a low beam light-distribution pattern, wherein an upper end edge of the shade is positioned near the optical axis in the vicinity of the rear-side focal point; and an additional reflector provided between the light source bulb and the shade, for reflecting light from the light source laterally outwardly and diagonally forward of the vehicle through a gap between the reflector and the projection lens, and for forming an additional light-distribution pattern by a reflected light from the additional reflector, wherein the additional light-distribution pattern partially overlaps a laterally outward end portion of a basic light-distribution pattern formed by a light emitted from the light source, reflected by the reflector and transmitted through the projection lens.

2. The vehicle headlamp according to claim 1, wherein the light source is constructed as a linear light source extending along a bulb center line.

3. The vehicle headlamp according to claim 1, wherein a reflecting surface of the additional reflector has a substantially elliptical horizontal sectional shape in which the light source constitutes a first focal point and a point between the reflector and the projection lens constitutes a second focal point.

4. The vehicle headlamp according to claim 1, wherein the additional reflector comprises an extended reflecting surface portion extending forward from a reflecting surface of the additional reflector.

5. The vehicle headlamp according to claim 4, wherein the additional reflector comprises a second additional reflector provided laterally outwardly of the additional reflector for reflecting light from the light source towards the extended reflecting surface portion and forming a second additional light-distribution pattern that partially overlaps a laterally outward end portion of the additional light-distribution pattern.

6. The vehicle headlamp according to claim 5, wherein a reflecting surface of the second additional reflector has a substantially ellipsoidal surface shape in which the light source constitutes a first focal point and a point between the second additional reflector and the additional reflector constitutes a second focal point.

7. The vehicle headlamp according to claim 1, further comprising:

a transparence cover provided forward of the projection lens and comprising a corner portion, wherein the transparence cover is curved at the corner portion to continuously extend rearward from a laterally inboard side to a laterally outboard side, and wherein the reflected light from the additional reflector is transmitted through the corner portion to be emitted diagonally forward of the vehicle.

* * * * *